M. L. BUSH.
MILK-COOLER AND HEATER.
No. 170,986.            Patented Dec. 14, 1875.
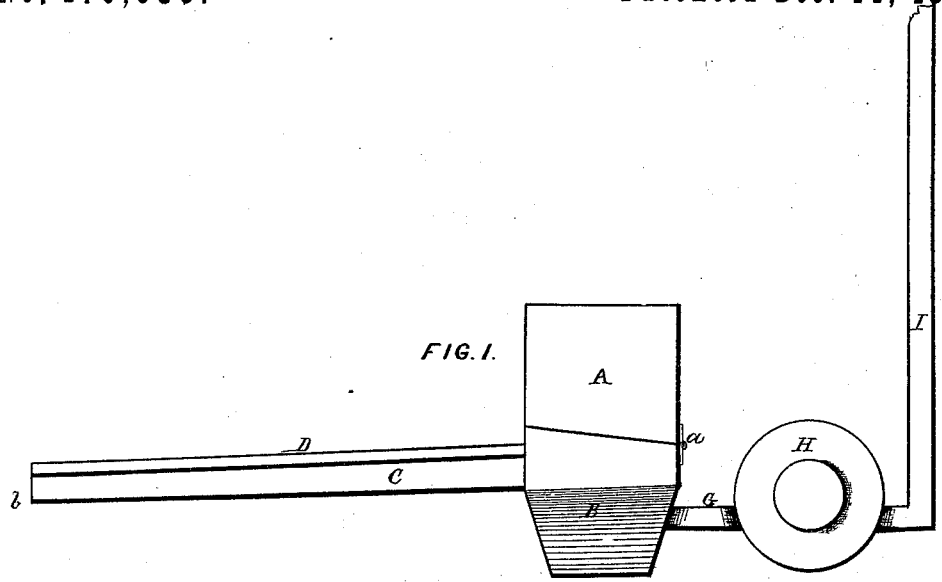
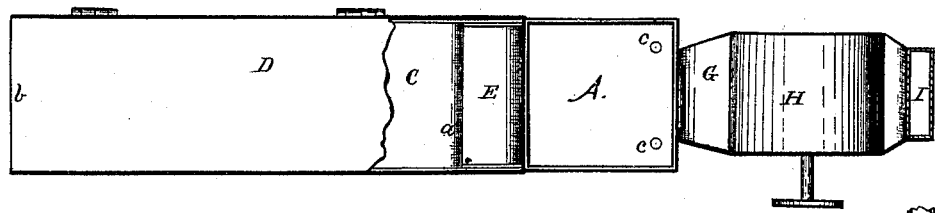
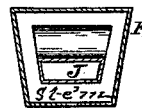
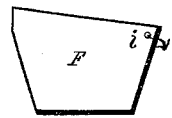
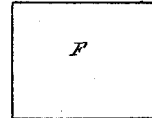
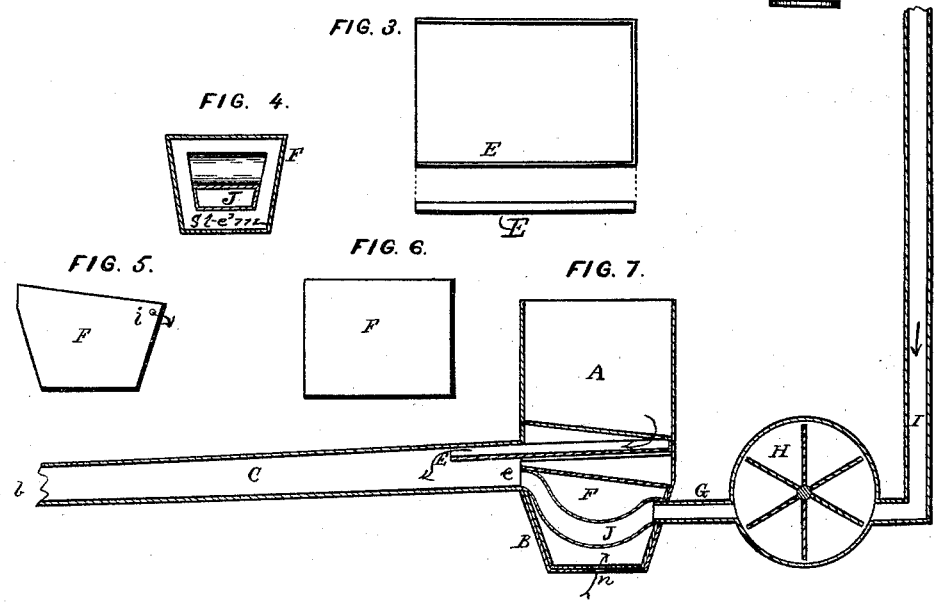
WITNESSES.            INVENTOR.

UNITED STATES PATENT OFFICE.

MARTIN L. BUSH, OF HUNTINGTON, OHIO.

IMPROVEMENT IN MILK COOLERS AND HEATERS.

Specification forming part of Letters Patent No. 170,986, dated December 14, 1875; application filed October 4, 1875.

*To all whom it may concern:*

Be it known that I, MARTIN L. BUSH, of Huntington, in the county of Lorain and State of Ohio, have invented new and useful Improvements in Milk Cooler and Heater, of which the following is a description, reference being had to the accompanying drawings making a part of this specification, in which Figure 1 is a side view of the milk cooler and heater. Fig. 2 is a plan view. Figs. 3, 4, 5, and 6 are detached sections. Fig. 7 is a longitudinal section.

Like letters of reference refer to like parts in the several views.

The nature of this invention relates to an apparatus for cooling and warming milk preparatory to its being made into cheese.

The construction and operation thereof are substantially as follows:

In the process of the manufacture of cheese it is a matter of great necessity that the milk be of a certain temperature for curdling. To this end, in warm weather it becomes necessary to cool the milk down to such temperature, and in cold weather it is equally necessary to warm it up to said temperature.

To accomplish these two objects is the purpose of this invention on milk cooler and heater, and which consists of a receiver, A, hinged at $a$ $a$ to an ice-box, B, whereon the receiver stands. C is a chute, opening into the chamber or ice-box B, and covered by a lid, D, hinged to one side of the chute. Immediately under the bottom of the receiver is arranged an inclined shelf, E, Fig. 2, the end of which projects into the chute, and is elevated above the bottom thereof, as will be seen in Fig. 7. A detached view of said inclined shelf is shown in Fig. 3. Within the ice-box is a steam-chest, F, Fig. 7, a detached view of which is shown in Figs. 4 and 5. Attached to the ice-box by a pipe, G, is an air-blower, H, constructed and operated as blowers are in ordinary use, and of which I is the induction air-pipe.

The practical operation of the above-described apparatus is as follows for cooling milk. To this end the steam-chest F is removed from the ice-box, and in place thereof is introduced a quantity of ice, filling the box up to the air passage or pipe G. The blower is now operated, thereby forcing a continuous volume of air, through the pipe G, into the box above the ice, which is therein cooled by the ice. The cooled air passes from the box, through the opening $e$, into the chute C, down which it passes, and escapes therefrom at the end $b$. The milk to be cooled is thrown into the receiver A, from which it flows, through the holes $c$ $c$ in the bottom thereof, down upon the inclined shelf E, over which it spreads, and falls in a sheet from the end $a'$ onto the bottom of the chute. As it falls from the shelf it is at once caught in the current of air from the ice-box, and thereby cooled, flowing, along with the air, down the chute, and falls therefrom into the cheese-vat in proper condition for curdling.

In the event the milk is cold and needs warming, the steam-chest F is placed in the box in lieu of the ice, and the air-pipe G put in connection with the air-conduit J, passing through the chest, and which communicates with the chute at the opening $e$, above referred to. Steam is inducted into the chest through an opening, $n$, Fig. 7, made in the bottom of the ice-box and that of the steam-chest, in which opening one end of a steam-pipe leading from a boiler is inserted, thereby filling the space about the conduit J with steam, which, when necessary, may be allowed to escape therefrom through an opening, $i$, Fig. 5, made in the side of the steam-chest, the top, side, and bottom of which are hollow, as shown in Fig. 4.

The cool air, as it is forced by the blower through the conduit J into the chute C, is warmed by the heat imparted to it by the steam in the steam-spaces of the chest surrounding the conduit, which, in turn, warms the milk as it passes through it, while falling from the shelf upon the floor of the chute.

The milk, by this means, is brought to the proper temperature for manipulation in the curd-vat.

What I claim as my invention, and desire to secure by Letters Patent, is—

1. In combination with the ice-box B and steam-chest F, the blower H and conduit J, substantially as and for the purpose set forth.

2. The receiver A, shelf E, and chute C, in combination with the conduit J, box B, and blower H, substantially as and for the purpose described.

MARTIN L. BUSH.

Witnesses:
 J. H. BURRIDGE,
 JOHN O. BUSH.